United States Patent [15] 3,671,872

Pauly [45] June 20, 1972

[54] HIGH FREQUENCY MULTIPLE PHASE SIGNAL GENERATOR

[72] Inventor: Donald E. Pauly, Salt Lake City, Utah

[73] Assignee: Telemation, Inc., Salt Lake City, Utah

[22] Filed: March 26, 1971

[21] Appl. No.: 128,838

[52] U.S. Cl. .......... 328/55, 328/43, 328/41, 328/134

[51] Int. Cl. .......... H03b 3/04

[58] Field of Search .......... 328/41, 42, 43, 48, 55, 133, 328/134; 307/225, 262

[56] References Cited

UNITED STATES PATENTS

| | | | |
|---|---|---|---|
| 3,184,612 | 5/1965 | Petersen | 307/225 X |
| 3,212,010 | 10/1965 | Podlesny | 328/42 X |
| 3,239,765 | 3/1966 | Carbrey | 328/42 X |
| 3,395,352 | 7/1968 | McCammon | 328/48 X |
| 3,588,707 | 6/1971 | Manship | 328/55 |

*Primary Examiner*—John S. Heyman
*Attorney*—Lynn G. Foster

[57] ABSTRACT

A high frequency phase generator comprising an oscillator, operating at eight times the desired frequency. A first set of flip-flop circuits divides the frequency down to the desired frequency. A second set of flip-flop circuits is provided with clock signals at the oscillator frequency and is connected so that the first flip-flop circuit of the second set is fed by the output of the first set and each subsequent flip-flop circuit in the second set is fed by the output of the preceding flip-flop circuit. Due to timing differences resulting from the two different frequencies, each flip-flop circuit in the second set produces two outputs which are 180° out of phase with each other and 45° out of phase with the outputs of the adjacent flip-flop circuits.

5 Claims, 2 Drawing Figures

INVENTOR.
DONALD E. PAULY
BY Lyman L. Foster
ATTORNEY

INVENTOR.
DONALD E. PAULY

BY

ATTORNEY

HIGH FREQUENCY MULTIPLE PHASE SIGNAL GENERATOR

BACKGROUND

1. Field of Invention

This invention relates to phase generators and is particularly directed to high-frequency, multiple-phase signal generators such as are employed for the generation of accurate, discrete reference phases of a color television subcarrier.

2. Prior Art

The prior art in subcarrier and high frequency phase determination consists in the use of resistors, inductors, and capacitors to derive different phase relationships. This method is unstable under temperature conditions due to component value changes. In addition, component tolerances usually must be one-tenth percent or better in order to preserve a given phase relationship to better than one degree. Also, slight variations in stray inductance or capacitance make holding close tolerances very difficult even if temperature drift is controlled. Up to the present, these problems have been handled by making the elements of the phase determining networks adjustable to compensent for component tolerances, strays, and drift.

BRIEF SUMMARY AND OBJECTS OF THE INVENTION

This method uses no precision inductors, capacitors, or resistors. This invention also has no adjustments.

In the circuit of the present invention, eight phases of 3.579545 mhz are generated from a high frequency oscillator of eight times frequency or 28.636363 mhz. This oscillator is applied through an appropriate buffering gate to five high speed flip-flops. The two outputs from each of the first four flip-flops provide the eight phase outputs of this invention. The two outputs from the fifth flip-flop are used to provide an extra phase reference for monitoring purposes and to provide a load for the last flip-flop which is identical to the load of each of the first four flip-flops.

Accordingly, it is an object of the present invention to provide an improved high frequency phase generator.

Another object of the present invention is to provide a high frequency phase generator which is not temperature sensitive.

A further object of the present invention is to provide a high frequency phase generator which is extremely accurate, reliable and is virtually maintenance-free.

Another object of the present invention is to provide a high frequency phase generator comprising an oscillator, operating at a frequency equal to the desired frequency multiplied by the number of different phase output signals desired, together with a first plurality of flip-flop circuits connected to form a ring counter driven by said oscillator to derive said desired frequency, and a second plurality of flip-flop circuits connected in series and fed by said first plurality of flip-flops while being clocked by said oscillator.

These and other objects and features of the present invention will be apparent from the following detailed description taken with reference to the accompanying drawings.

DETAILED DESCRIPTION OF THE ILLUSTRATED EMBODIMENT

Figure 1:
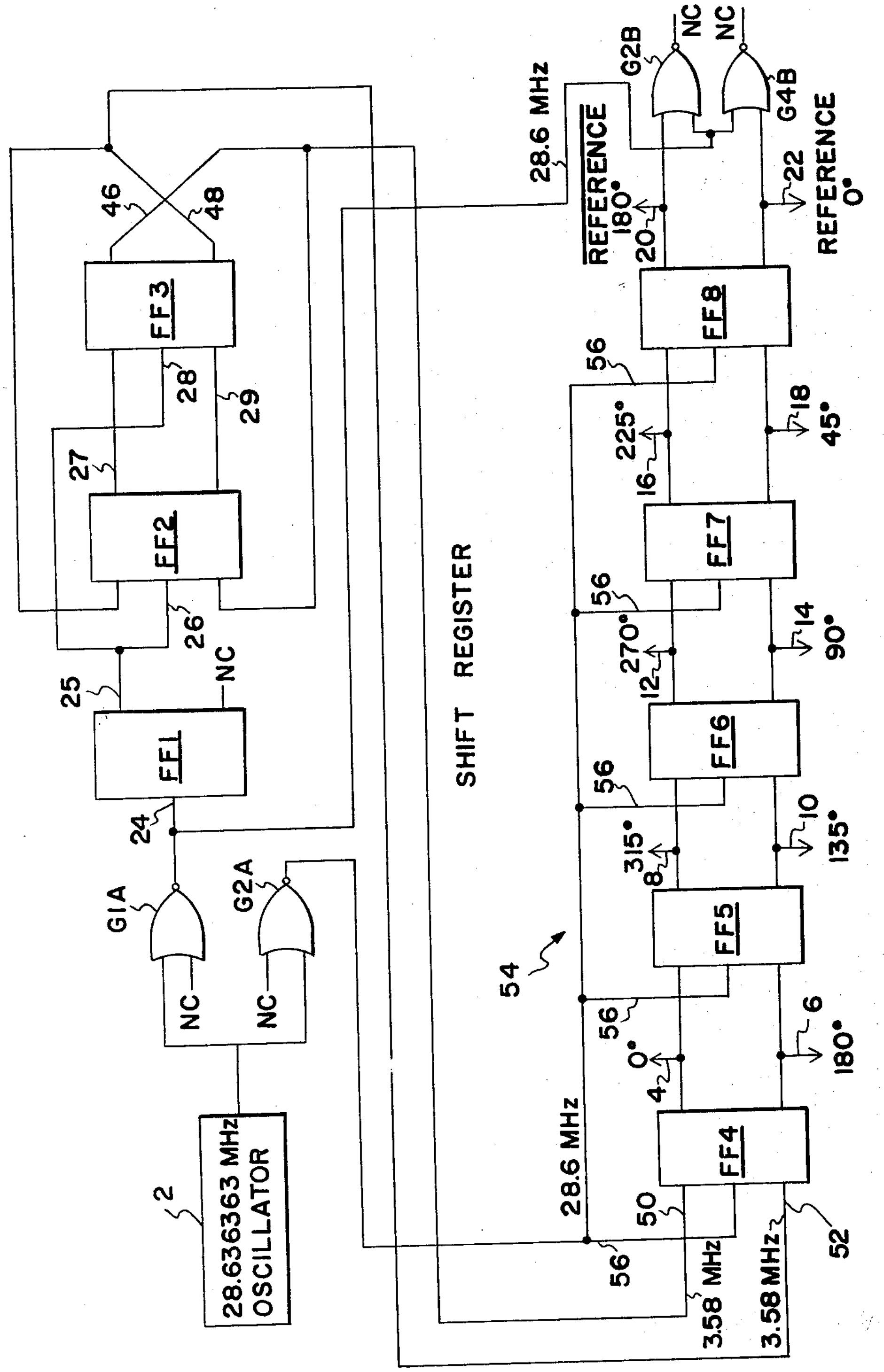
FIG. 1 is a diagrammatic representation of a high frequency phase generator embodying the present invention.

In that form of the present invention chosen for purposes of illustration, FIG. 1 shows an oscillator 2 and eight high speed flip-flops FF1 - FF8. The designation "NC" in the drawings means "not connected." The oscillator 2 operates at a frequency of 28.636363MHz and is applied through an appropriate buffering gate G2A to five high speed flip-flops FF4 – FF8. The two outputs from each of the first four flip-flops FF4 – FF7 provide the eight phase outputs of this invention, as seen at 4–18. The two outputs 20 and 22 from the fifth flip-flop FF8 are identical with outputs 4 and 6 of flip-flop FF4, when reversed, and are used to provide an extra phase reference for monitoring purposes and to provide a load for flip-flop FF7 that is identical to the loads of flip-flops FF4, FF5, and FF6.

The 28.636363MHz oscillator 2 is applied through a buffer G1A to two gates G2B and G4B and the clock input 24 of flip-flop FF1. Flip-flop FF1 divides the input from oscillator 2 by two to produce 14.318181MHz which is applied to the clock inputs 26 and 28 of two more flip-flops FF2 and FF3. The transitions of this 14.3MHz square wave are delayed by one flip-flop propagation time from the positive transitions of the clock. Flip-flops FF2 and FF3 are connected as a ring counter shift register. Flip-flop FF3 assumes the preceding state of flip-flop FF2 and flip-flop FF2 assumes the opposite state of flip-flop FF3 upon the positive transition of the clock pulse. This ring counter is stable from any starting condition but for purposes of discussion we will assume that the initial states on both flip-flops FF2 and FF3 were zeros.

Figure 2:
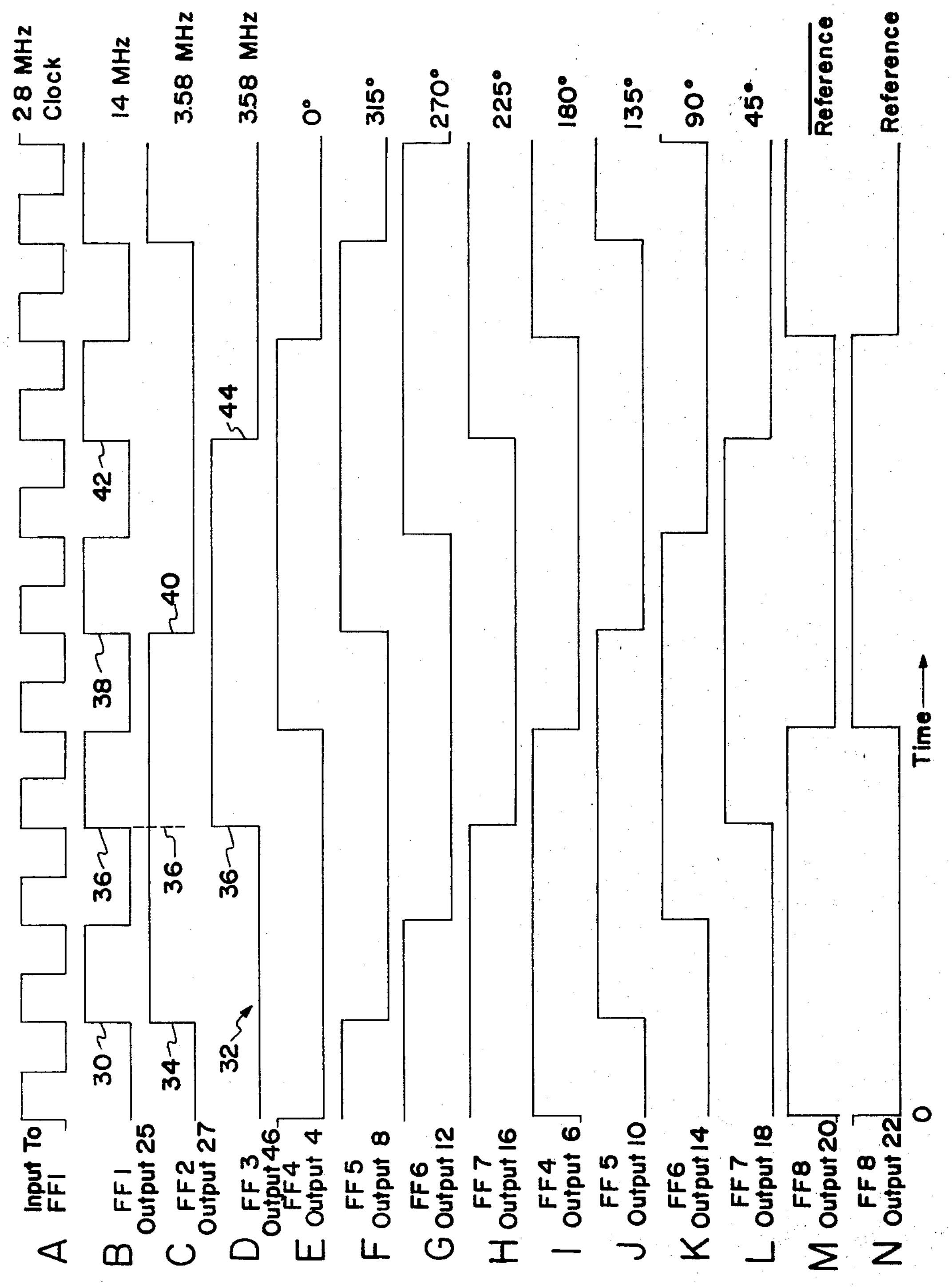
FIG. 2 is a timing diagram showing the signals appearing at indicated points in the phase generator of FIG. 1 as functions of time.

If the initial states of both flip-flops FF2 and FF3 were zeros, flip-flop FF3 will not change upon the positive transition of the 14.3MHz clock pulse, shown at 30 in curve B of FIG. 2, since it is already in the same state as flip-flop FF2, as seen at 32 in curve D of FIG. 2. However, flip-flop FF2 will change states to a 1, as shown at 34 in curve C of FIG. 2, since it must assume the opposite state of flip-flop FF3 upon positive transition of the 14.3MHz clock. We now have a 1 in flip-flop FF2 and a 0 in flip-flop FF3.

As seen in curve D of FIG. 2, flip-flop FF3 will become a 1 on the next clock pulse, seen at 36 in curves B and D of FIG. 2, since flip-flop FF2 was not in the same state as flip-flop FF3 at that time. Flip-flop FF2 will not change states since it was already opposite in state to flip-flop FF3, as seen at 36 curves B and C of FIG. 2.

Now there is a 1 in both flip-flop FF2 and flop FF3. At the next clock pulse, seen at 38 in curve B, flop FF3 does not change since it is already the same as flip-flop FF2. However, flip-flop FF2 changes to a 0, as seen at 40 in curve C, because it was previously the same as flip-flop FF3.

We now have a 0 in flip-flop FF2 and a 1 in flip-flop FF3. At the next clock pulse, shown at 42 in curve B, flip-flop FF3 will change to 0, as seen at 44 in curve D, and flip-flop FF2 will remain a 0 since it was already in the opposite state of flip-flop FF3.

This returns us to the original states assumed. Since the operation requires four clock cycles to complete one output cycle, it therefore divides the input frequency by four. Since both flip-flops FF2 and FF3 are a 1 for two clock cycles and a 0 for two clock cycles, the outputs are symmetrical square waves at one-fourth of 14.3MHz or 3.58MHz. The outputs 46 and 48 of the flip-flop FF3 are fed to the inputs 50 and 52 of flip-flop FF4 in the shift register indicated generally at 54 and formed by flip-flops FF4 – FF8.

Flip-flops FF4 – FF8 are connected to form shift register 54 and are fed a common shifting clock signal by oscillator 2 through gate G2A, as seen at 56 in FIG. 1. A 3.58MHz square wave is applied to the input of flip-flop FF4 and its complement is applied to the input 52. The output of flip-flop FF4 will be a copy of the 3.58MHz input, as seen in curves E and I, but delayed by the time between the transition of the two inputs and the next positive transition of the clock. Since the transitions of the inputs 50 and 52 occur a short time after the positive transition of the clock (two propagation times or 10 nanoseconds), the flip-flop FF4 will not be changed by the clock pulse that caused a transition of the inputs 50 and 52. It will, however, assume the state of the inputs 50 and 52 at the next positive transition of the clock pulse. Therefore, as seen in curves E and I, the two outputs 4 and 6 of flip-flop FF4 are 3.58MHz square waves that are the complements of each other and the timing of whose transitions is determined solely by the clock pulses from oscillator 2, as seen in curve A. The outputs are labeled 0° and 180° for the 4 and 6 outputs of flip-flop FF4 respectively. This new pair of squarewaves is applied to flip-flop FF5 which operates in the same manner as flip-flop FF4 except that its inputs are delayed from the clock by only one flip-flop propagation time (5 nanoseconds), as seen in curves F and J.

Since the clock frequency supplied through 56 by oscillator 2 is eight times the 3.58MHz frequency, each complete cycle of the clock signal on input 56 represents only 45 ° of the 3.58MHz cycle. Therefore, if the 3.58MHz signal is delayed by one clock pulse it will be delayed 45°.

Flip-flop FF5 is fed by the outputs 4 and 6 from flip-flop FF4 which have phases of 0° and 180°, respectively. Since this will delay the action of flip-flop FF5 for one clock pulse the outputs 8 and 10 of flip-flop FF5 will have phases of 315° and 135°, respectively, as seen in curves F and J of FIG. 2. The outputs 8 and 10 from flip-flop FF5 are fed to flip-flop FF6, causing the outputs 12 and 14 of flip-flop FF6 to have phases of 270° and 90°, respectively, as seen in curves G and K of FIG. 2. Similarly, the outputs 12 and 14 from flip-flop FF6 are fed to flip-flop FF7 to cause the outputs 16 and 18 from flip-flop FF7 to have phases of 225° and 45°, respectively, as seen in curves H and L of FIG. 2. Finally, the outputs 16 and 18 from flip-flop FF7 are fed to flip-flop FF8 which causes the outputs 20 and 22 from flip-flop FF8 to have phases of 180°and 0°, respectively, as seen in curves M and N of FIG. 2. It will be seen that the phases of outputs 20 and 22 from flip-flop FF8 are identical with the outputs 6 and 4, respectively, from flip-flop FF4. As discussed above, the outputs 20 and 22 from flip-flop FF8 are used as references. At the same time, the outputs 20 and 22 from flip-flop FF8 are fed to dummy loads G2B and G4B to simulate the load of driving another flip-flop. This is done to preserve phase accuracy by keeping rise times and propagation times as uniform as possible between the various flip-flops and is necessary because flip-flops FF4 – FF7 drive other flip-flops, while flip-flop FF8 does not.

Obviously, numerous variations and modifications may be made without departing from the present invention. Accordingly, it should be clearly understood that the form of the present invention described above and shown in the accompanying drawings is illustrative only and is not intended to limit the scope of the invention.

I claim:

1. A phase generator comprising:
- an oscillator having means generating a single continuous pulse train of relatively high frequency, the period of which is no greater than the desired spacing between adjacent output phases to be produced;
- a first set of frequency dividers arranged in tandem and serially connected one to the next, and
- a second set of frequency dividers arranged in tandem and serially connected one to the next and comprising in combination a shift register, each frequency divider of the second set having at least two outputs;
- means directly communicating said single continuous pulse train as input to the first frequency divider of the first set of dividers and as input to each of the frequency dividers of the second set of dividers;

- means communicating the divided down output from the last frequency divider of the first set as input to the first frequency divider of the second set causing said output to enable the first frequency divider of the second set and the oscillator pulse train causes said first frequency divider to fire, which enables a second frequency divider of the second set, whereby the two outputs of each frequency divider of the second set are of opposite phase and the corresponding outputs of each successive frequency divider of the second set are of uniform phase difference, respectively.

2. A phase generator comprising:
- an oscillator operating at a frequency having a period no greater than the desired spacing between adjacent output phases to be produced;
- a first combination of circuits comprising first, second and third flip-flop circuits;
- means connecting said first flip-flop circuit to be driven by said oscillator and causing said first flip-flop circuit to provide a first signal at half the frequency of said oscillator;
- means connecting said second and third flip-flop circuits to form a ring counter driven by the signal from said first flip-flop circuit and to provide an output signal having a frequency which is one-fourth the frequency of said first signal; and
- a second combination of circuits comprising additional flip-flop circuits connected to receive signals from said second and third flip-flop circuits and clocked by the signals from said oscillator and each serving to pass output signals at intervals determined by a transition of the signals from said oscillator subsequent to a transition of the signals from said second and third flip-flop circuits.

3. The device of claim 2 wherein:
- said second plurality of flip-flop circuits comprises five flip-flop circuits;
- means connecting the first of said five flip-flop circuits to be driven by the output signal from said first plurality of flip-flop circuits;
- means connecting each of the other of said five flip-flop circuits to be driven by the preceeding flip-flop circuit; and
- means connecting said oscillator to supply clock pulses to each of said five flip-flop circuits.

4. The device of claim 3 further comprising:
- dummy load means connected to be fed by the last of said five flip-flop circuits to simulate the load of another flip-flop circuit driven by said last flip-flop circuit.

5. The method of generating a plurality of high frequency signals of different phases, said method comprising the steps of:
- generating a first signal at a frequency having a period no greater than the desired spacing between adjacent output phases to be produced;
- dividing said first signal to provide a second signal at the desired frequency; and
- passing output signals at the frequency of said first signal at intervals determined by a transition of said first signal subsequent to a transition of said second signal.

* * * * *